June 2, 1931.  A. N. MERLE  1,808,566

POCKET VIEW TAKING CINEMATOGRAPHIC CAMERA WITH SPRING MOTOR

Filed April 25, 1929   2 Sheets-Sheet 1

André Noël Merle
INVENTOR

June 2, 1931. A. N. MERLE 1,808,566
POCKET VIEW TAKING CINEMATOGRAPHIC CAMERA WITH SPRING MOTOR
Filed April 25, 1929  2 Sheets-Sheet 2
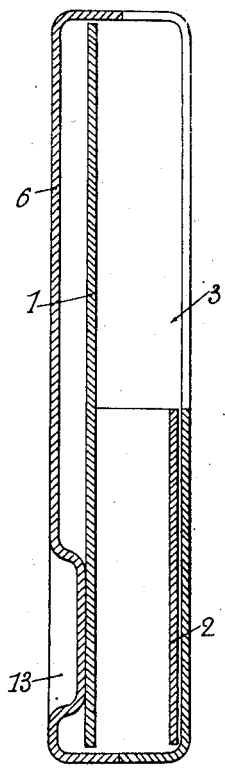
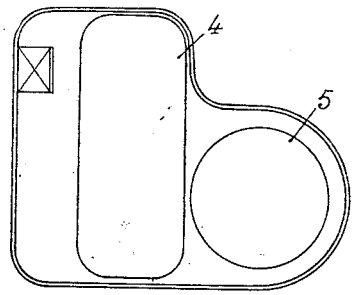
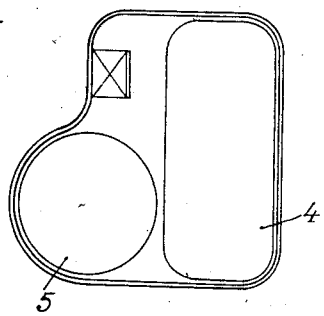
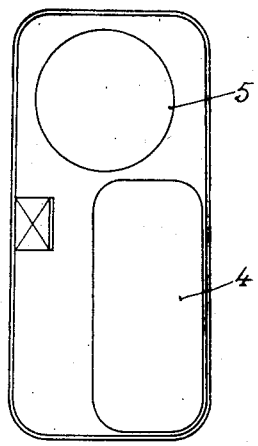
André Noël Merle
INVENTOR;
By
his Attorney.

Patented June 2, 1931

1,808,566

UNITED STATES PATENT OFFICE

ANDRÉ NOËL MERLE, OF VINCENNES, FRANCE, ASSIGNOR TO PATHÉ CINÉMA, ANCIENS ÉTABLISSEMENTS PATHÉ FRÈRES, OF PARIS, FRANCE

POCKET VIEW-TAKING CINEMATOGRAPHIC CAMERA WITH SPRING-MOTOR

Application filed April 25, 1929, Serial No. 357,892, and in France May 7, 1928.

The present invention relates to a particular arrangement of the parts in the interior of a cinematographic camera by which the size of the apparatus can be appreciably reduced, in such manner that it may be carried for instance in the coat pocket.

All of the operating elements such as the spring motor or barrel, the film case, claw device, shutter, and their controls, as well as the lens and the regulating device, are disposed between two main plates, and only a certain number of the gear wheels are in the overhung position.

The film case and the spring barrel are placed edge to edge, with the barrel preferably at the lower part, and the distance between the two main plates will thus depend solely upon the thickness of the film case, so that in fact the total thickness of the apparatus will depend directly upon the width of the film in use.

The said box also comprises pressed concave recesses which are adapted to contain certain of the parts, and chiefly the key for winding up the spring, also the finder, and the knob for starting the apparatus, since in order to provide a compact apparatus of this kind, such parts should not project beyond the surface.

In the case in which the said spring barrel occupies the lower part, the apparatus will thus be made more stable, since the heaviest part, or the said barrel, is situated at the bottom of the box and below the film case.

The accompanying drawings show by way of example various embodiments of the invention.

Fig. 3 is a section on the line C—D, showing the apertures in the box (the cover being removed) and also the aperture in the front plate for the insertion of the film case.

Figs. 4, 5 and 6 are diagrammatic views in which the spring barrel is respectively mounted at the rear of the film case, in front of the said case, or above the same.

Figure 1:
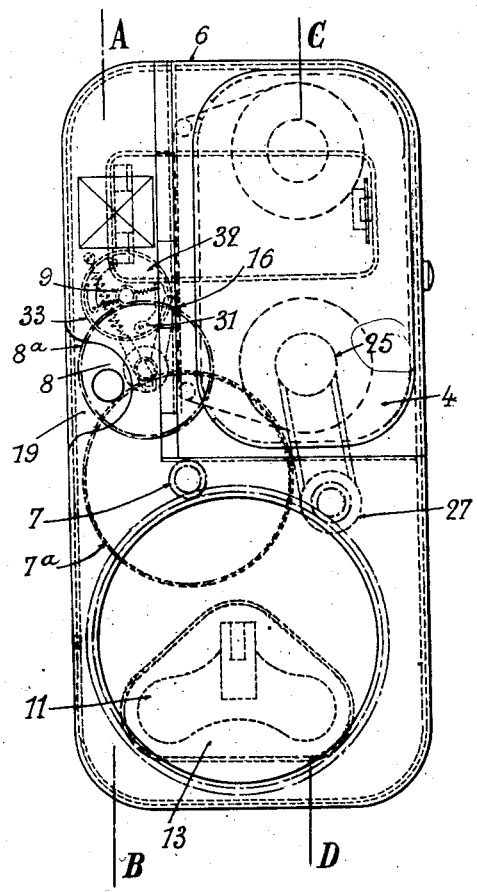
Fig. 1 is a general view of the apparatus according to the invention, with the spring barrel at the lower part.

In the said figures, 1 and 2 are the main plates, the plate 2 being cut out at 3 for the insertion of a film case 4. 5 is a casing for the driving spring. As observed, the said casing 5 and the film case 4 are placed edge to edge and substantially in line, between the said main plates 1 and 2. This arrangement provides for the disposition of the several parts in a box 6 which has a very flat shape and can thus be carried in the coat pocket after the manner of a portfolio.

The spring motor 5 drives a wheel 7 carrying upon its shaft a wheel $7^a$ which in turn engages a wheel 8 upon whose shaft is mounted a wheel $8^a$ coacting with a wheel 9. Certain of the gear wheels, such as $7^a$, 8, $8^a$, 9 may be placed in the overhung position on the outside of the space between the two main plates, that is, in the space between the plate 1 and the box 6. The part of the said space which is not occupied by the said overhung wheels, is used to contain the outer elements such as a winding key 11, a finder 12 and a starting knob 18. These different parts are disposed in stamped recesses 13—15—19 formed in the box, so that they will have the practically flush position. In this manner, the whole space within the box is occupied by the parts.

Figure 7:
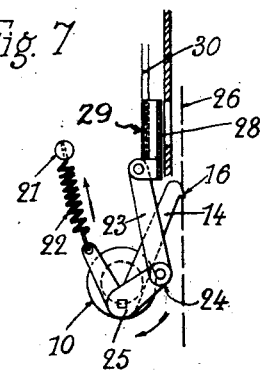
Fig. 7 shows a detail of the film-driving claw device and of the lever controlling the shutter.

Any suitable means, known per se, may be employed for the control of the claw device and the shutter. In the present example, upon the shaft of the wheel 8 is mounted a disk 10 (Figure 7) to which is pivoted a bell-crank lever 14 carrying on one arm the claw 16, the other arm being controlled by a spring 22 attached to a stationary point 21. The spring thus urges the tooth of the claw device against the film 26. During the descent of the pivoting point of the claw device, the latter, due to the form of its tooth, will draw down the film, and when the said pivoting point rises, the tooth will be released, due to its form and will rise while sliding against the film, but without displacing it.

The shutter 28 is movable in the guides 30 by means of the lugs 29, and is actuated by a link 23 pivoted to a crank arm 24 which is secured at 25 to the said claw-controlling disk 10, at the proper angle with reference to the point of pivotation of the claw device upon the said disk.

The stopping or the release of the movement takes place by the use of an external knob 18 on whose shaft is mounted the abutment 20 which in the idle position will be situated in the path of a plate 17 secured to the shaft of the wheel 8 and the plate 10, and which, when withdrawn, will allow the said plate to rotate.

The exposed film is wound in the case 4 by means of a toothed winding device mounted on a pulley 25 which is driven by a pulley 27, actuated by the spring barrel.

As shown in Figure 1, the shaft of the wheel 9 carries a speed regulating device comprising for instance suitable heavy masses 31 mounted on a disk 32 and urged by the centrifugal force against a brake drum 33.

Figure 2:
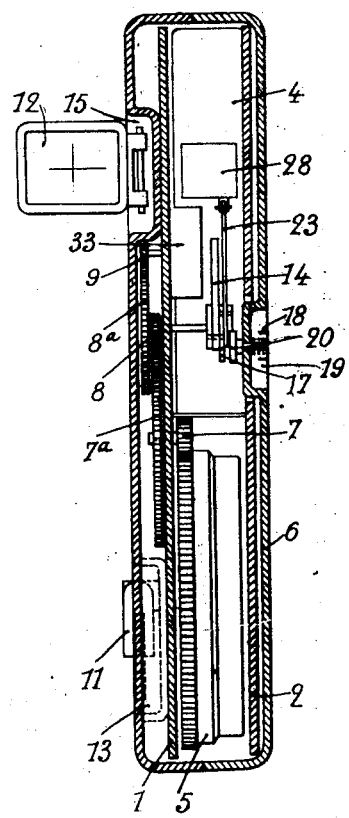
Fig. 2 is a section on the line A—B of Fig. 1.

In the construction shown in Figures 1 to 3, the said spring motor or barrel 5, which is the heaviest part of the apparatus, is situated below the said film case 4 and at the lower part of the box, so that the latter will be more stable. It is however feasible to dispose the film case and barrel in the various positions shown in Figures 4, 5 and 6, but these two elements are in all cases placed edge to edge and practically in line with one another.

Obviously, the said apparatus is susceptible of various modifications without departing from the principle of the invention.

Having now described my invention what I claim as new and desire to secure by Letters Patent is:

1. In a cinematographic camera, in combination a film case and a spring motor, said members being placed edge to edge and substantially in line relatively to each other, two main plates disposed on either side of said members, near said members and adapted to support said members, a box only slightly wider than one of said members and adapted to contain said plates with said members and provided with recesses, a winding key for said spring motor, a finder and a starting knob, said key, finder and knob being mounted on said box and adapted to be brought into said recesses, and, disposed between said main plates: a shutter mechanism; a claw mechanism and an objective lens.

2. In a cinematographic camera, in combination a film case and a spring motor, said members being placed edge to edge and substantially in line relatively to each other, two main plates disposed on either side of said members, near said members and adapted to support said members, a box only slightly wider than one of said members and adapted to contain said plates with said members and provided with recesses, a winding key for said spring motor, a finder and a starting knob, said key, finder and knob being mounted on said box and adapted to be brought into said recesses, an objective lens, a shutter mechanism, a claw mechanism and a regulating mechanism, said lens and mechanisms being disposed between said main plates, and power transmitting means between said spring motor and said claw, shutter and regulating mechanisms disposed partly between said main plates and partly between one of said plates and said box within the space left free between said recesses.

3. In a cinematographic camera, in combination a spring motor, a film case containing a winding reel and an unwinding reel, said spring motor and said reels being placed edge to edge and substantially in line relatively to each other, two main plates disposed on either side of said spring motor and film case and adapted to support said two members, a box only slightly wider than one of said two members and adapted to contain said plates with said members, and, disposed between said main plates: a shutter mechanism, a claw mechanism and an objective lens.

In testimony whereof I have signed my name to this specification.

ANDRÉ NOËL MERLE.